(12) United States Patent
Khanfor (10) Patent No.: US 9,684,056 B2
(45) Date of Patent: Jun. 20, 2017

(54) AUTOMATIC OBJECT TRACKING CAMERA

(71) Applicant: Abdullah I. Khanfor, Hoboken, NJ (US)

(72) Inventor: Abdullah I. Khanfor, Hoboken, NJ (US)

( * ) Notice: Subject to any disclaimer, the term of this patent is extended or adjusted under 35 U.S.C. 154(b) by 612 days.

(21) Appl. No.: 14/290,418

(22) Filed: May 29, 2014

(65) Prior Publication Data

US 2015/0350606 A1    Dec. 3, 2015

(51) Int. Cl.
*H04N 7/18* (2006.01)
*G01S 3/786* (2006.01)
*H04N 5/232* (2006.01)
*H04N 5/247* (2006.01)

(52) U.S. Cl.
CPC ....... *G01S 3/7864* (2013.01); *H04N 5/23229* (2013.01); *H04N 5/23245* (2013.01); *H04N 5/23296* (2013.01); *H04N 5/247* (2013.01)

(58) Field of Classification Search
None
See application file for complete search history.

(56) References Cited

U.S. PATENT DOCUMENTS

| | | | |
|---|---|---|---|
| 2005/0244033 A1* | 11/2005 | Ekin | G01S 3/7864 382/103 |
| 2012/0300079 A1 | 11/2012 | Hale | |
| 2012/0306994 A1* | 12/2012 | Schwartz | G06F 19/3418 348/14.08 |

FOREIGN PATENT DOCUMENTS

| | | |
|---|---|---|
| EP | 2 096 862 A1 | 9/2009 |
| EP | 2 150 057 A2 | 2/2010 |
| WO | WO 2008/048544 A2 | 4/2008 |

* cited by examiner

*Primary Examiner* — Dakshesh Parikh
(74) *Attorney, Agent, or Firm* — Oblon, McClelland, Maier & Neustadt, L.L.P.

(57) ABSTRACT

An automatic ball tracking camera for taking video images of a ball game includes a two-stage video camera unit including two sets of camera modules arranged on top of each other, each camera module including a video camera, a zoom lens, and a pan-tilt pod. A video switcher selects one video camera as output and an image processor analyzes an video image currently in use for output and determines whether a ball position moves out from a preset area defined on that video image. A controller determines a target viewing direction to recapture the ball within the preset area in a close-up mode, adjusts the video camera currently not in use for output to achieve the target viewing direction, and switches the output to the video camera adjusted when determined that the ball position moves out from the preset area.

16 Claims, 8 Drawing Sheets

Figure 8

AUTOMATIC OBJECT TRACKING CAMERA

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

Field of the Disclosure

This disclosure relates to a video camera that automatically tracks a sports ball in a game or sporting event and outputs an image of the game or sporting event including the sports ball.

Description of the Related Art

In ball games such as soccer, football, basketball, volleyball, etc., sports balls typically trace complex paths, making it difficult to follow the balls with video cameras except in wide shot mode or by expert photographers specializing in taking ball sports videos. On the other hand, video images in wide shot mode do not usually provide detailed information as to actions of individual players happening around the sports balls, and it would be costly to hire the expert photographers.

Video images in close-up mode are preferable to obtain details of actions. However, if a video camera is panned and/or tilted in an attempt to follow the movement of ball while taking video images in close-up mode, objects that were captured in the video image but not moving with the ball tend to be smeared into background. It is difficult to capture high quality video images in close-up mode while tracking the balls during ball games.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to an embodiment, an automatic ball tracking camera for taking video images of a ball game is provided. The automatic ball tracking camera includes a two-stage video camera unit, a video switcher, an image processor, and a controller. The two-stage camera unit includes two sets of camera modules that may be arranged on top of each other, where each camera module includes a video camera, a zoom lens fitted on the video camera, a zoom drive mechanism for changing a zoom magnification, and a pan-tilt pod on which the video camera is mounted for changing a viewing direction of the video camera. The video switcher receives two video signals from the two video cameras and selects one of the two video signals as output. The image processor receives one of the two video signals currently in use for output, analyzes an output video image corresponding to the video signal currently in use for output, and determines whether or not a ball position moves out from a preset area defined on the output video image or not.

When the image processor determines that the ball position moves out from the preset area, the controller determines a target viewing direction for the video camera currently not in use for output so that a video image to be taken at the target viewing angle in a close-up mode recaptures the ball within the preset area, controls the pan-tilt pod of the video camera currently not in use for output for adjustment to achieve the target viewing direction, and controls the video switcher to switch the output to the video camera thus adjusted.

Preferably, the video camera that is adjusted may be aligned with the video camera currently in use for output immediately after switching the output.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

The present inventor recognizes the foregoing issues in the related art and the need to provide an automatic ball tracking camera that tracks a sport ball and automatically guides the camera so that the sport ball appears in or near the center of video images to be outputted.

For the purposes of explanation, the automatic ball tracking camera includes two video cameras arranged on top of each other. Although in other embodiments the system may include more than two video cameras which may be arranged next to each other or in another arrangement. In one implementation, one camera is held still for taking a video image for output while monitoring a ball position, and the other is put in standby and panned and/or tilted to a new viewing direction for ball tracking when the ball position moves out from a preset area of the video image for output. Further, upon panning and/or tilting to the new viewing direction, roles of the video cameras are swapped. The video camera that has been moved is now held still for taking the video image for output while monitoring a ball position, and the other video camera is now in standby state. The foregoing operation is repeated during a sport such as baseball, basketball, or soccer. The system is not limited to sports, however, and can be utilized to track any predetermined object, such as a ball, within the field of view of the automatic ball tracking camera. This enables the system to track the ball position during a ball game while taking high quality video images in close-up mode in which the ball appears in the preset area defined on the video image for output.

Referring now to the drawings, wherein like reference numerals designate identical or corresponding parts throughout the several views.

Figure 1:
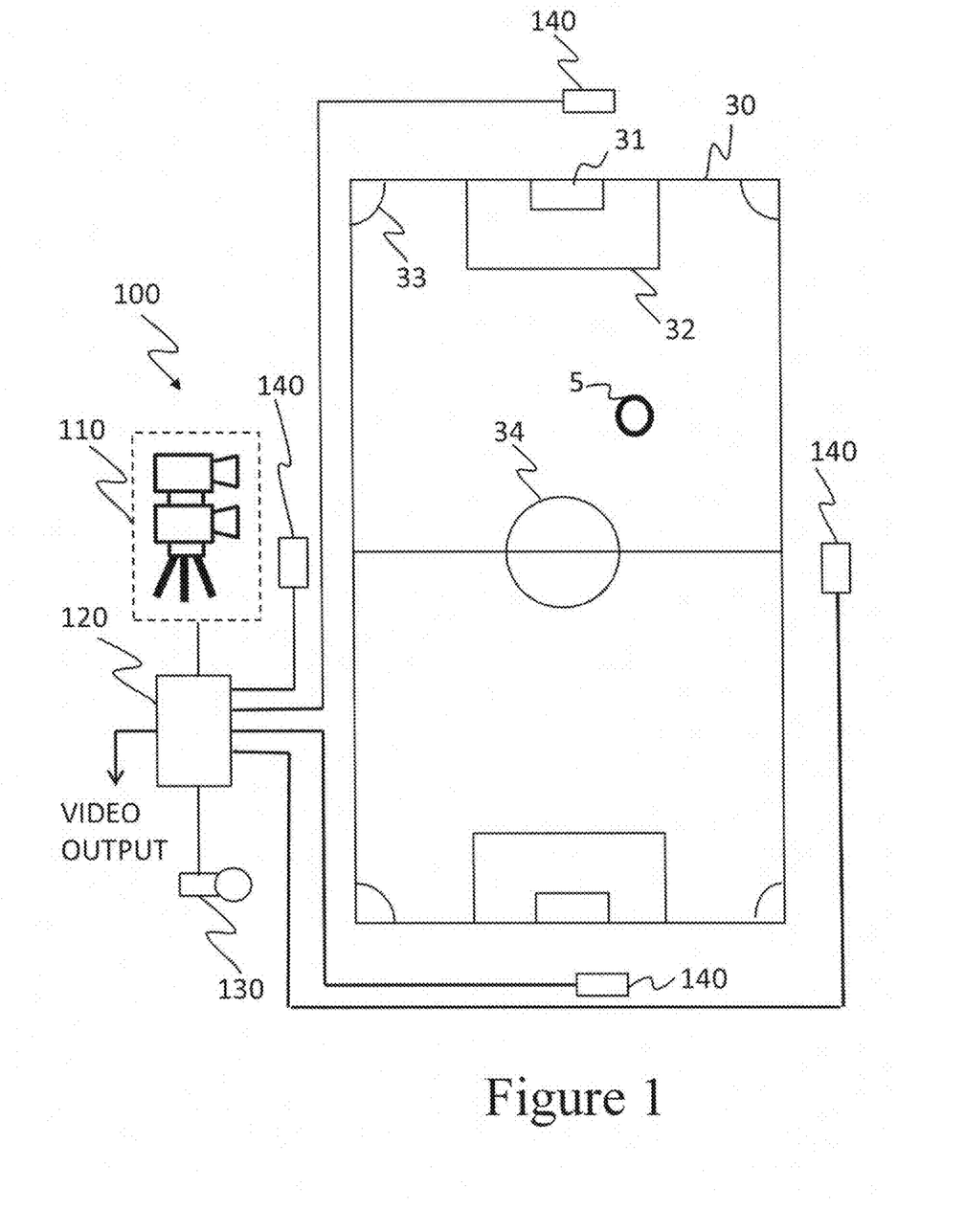
FIG. 1 is a schematic diagram illustrating an arrangement of an automatic ball tracking camera system according to an exemplary embodiment.

FIG. 1 is a schematic diagram illustrating an arrangement of an automatic ball tracking camera 100 around a game field 30 according to an exemplary embodiment. The automatic ball tracking camera 100 includes a two-stage camera unit 110, a processing unit 120, a microphone 130, and ball position sensors 140. The present embodiment is described for the case where the automatic ball tacking camera 100 is used to take video of a soccer game performed on the field 30 while tracking a ball 5. However, the embodiments are not limited to this example and may be used for any other ball sports such as soccer, football, basketball, volleyball, and the like.

The two-stage camera unit 110 includes two video cameras, which will be described in detail below, and outputs their video signals to the processing unit 120. The video signal corresponds to video images captured by the video camera. The processing unit 120 receives the two video signals and selects one of them as video output. The video output may be used for display or live broadcasting or may be recorded on storage media.

The processing unit 120 also tracks the ball 5 by way of analyzing an output video image that is one of the video images received and is currently in use for output. When the processing unit 120 detects that the ball 5 moves out from a preset area defined on the output video image, the processing unit 120 controls the two-stage camera unit 110 to adjust the viewing direction of the video camera currently not in use for output so that a video image to be captured at a new viewing direction includes the ball 5 within the preset area of the output video image. Upon completing the adjustment, the processing unit 120 switches the video output to the video camera whose viewing direction has been just adjusted. The foregoing process is repeated during a ball game, and the video output supplies video images in a close-up mode while switching the video cameras to be used for taking the output video image. This enables the automatic ball tracking camera to provide a fixed field of view for the close-up shot while autonomously tracking the ball 5 position.

The microphone 130 collects audio sound during a game. The processing unit 120 receives output of the microphone 130 and detects the sound of referee whistle. However, the system is not limited to the sound of a referee whistle and can be programmed to recognize additional sounds, such as particular voices or environmental sounds, via signal processing and filter processing as would be understood by one of ordinary skill in the art. When the referee whistle is detected, the processing unit 120 adjusts the viewing direction and the zoom magnification of the video camera currently not in use for output so as to take a video image in a wide-shot mode. Upon completing the adjustment, the video output is switched to the video camera thus adjusted. That is, the video output is switched from the close-up mode to the wide-shot mode. This allows viewers to watch a larger portion of the field 30 when a game is interrupted by the referee's action.

The ball position sensors 140 measure respective distances to the ball 5 and sends outputs indicative of measured results to the processing unit 120. In the present embodiment, a transmitter is embedded in the ball 5. The transmitter transmits a radio signal at a preset frequency, and the ball position sensors 140 detect the radio signal emitted from the transmitter for the measurement of distance. The controller 120 receives the outputs from the respective ball positioning sensors 140 and triangulates the ball 5 position in the field 30. Note that, however, the method of determining the ball position is not limited to this example, and any other object positioning techniques may be employed.

Further, in the present embodiment, this position information can be used to adjust a video camera as well as a viewing direction based on the location of the ball and advantageously provides the location of the ball for the automatic ball tracking camera to pick up in the event it loses track of the ball for a predetermined period of time. Further, the position information can be utilized to determine when the ball 5 is located within a predetermined area designated for predesigned shot. Accordingly, based on a spatial relationship between the ball 5 and a point of interest in the field 30 such as a goal 31, a penalty area 32, a corner arc 33, a center circle 34, or the like, the automatic ball tracking camera can automatically move a video camera not used for output to the area of the predesigned shot having the ball 5 based on the position information and switch the output to the adjusted camera. This allows to take the output video image in a predesigned shot mode for which viewing direction and zoom magnification settings are selected in advance for a particular situation in a game such as a penalty kick performed in the penalty area 22. This allows the video output to switch to the predesigned shot mode.

Figure 2:
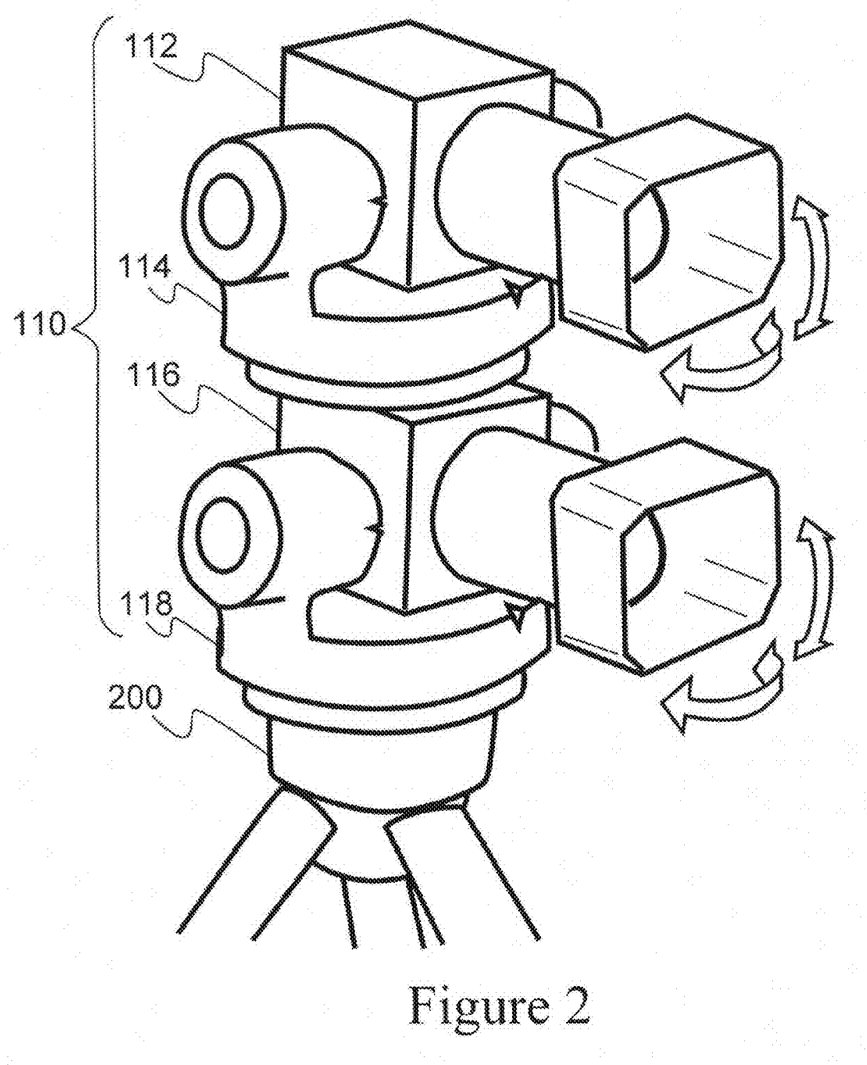
FIG. 2 is a schematic perspective view of a two-stage video camera unit of the automatic ball tracking camera according to an exemplary embodiment.

FIG. 2 is a schematic perspective view of a two-stage video camera unit 110 according to an exemplary embodiment. The two-stage camera unit 110 is mounted on a tripod 200. The two-stage camera unit 110 includes two sets of camera modules arranged on top of each other. A top camera module includes a video camera 112 and a pan-tilt pod 114 on which the video camera 112 is mounted. The pan-tilt pod 114 supports and turns the video camera 112 in a panning direction and a tilting direction to change a viewing direction of the camera 112 in response to an input control signal. Note that in this specification, "panning" means the rotation in a horizontal plane of video camera, and "tilting" means the rotation in a vertical plane of video camera. The video camera 112 includes an autofocus mechanism, a zoom lens fitted thereon, and a zoom drive mechanism for changing a zoom magnification of the zoom lens.

Similarly, a bottom camera module includes a video camera 116 and a pan-tilt pod 118 on which the video camera 116 is mounted for changing the viewing direction of the video camera 116. The video camera 116 includes a zoom lens fitted thereon and a zoom drive mechanism for changing a zoom magnification of the zoom lens.

The pan-tilt pods 116 and 118 are arranged on top of each other, preferably in such a way that their axes of rotation align with each other in the panning direction and parallel to each other in the tilting direction. Further, the pan-tilt pods 116 and 118 are arranged so that they can move independently from each other without interference in response to control signals inputted while maintaining their foregoing relative spatial relationship. This allows the two video cameras 112 and 116 to take video images from substantially the same viewing point irrespective of their viewing directions.

Figure 3:
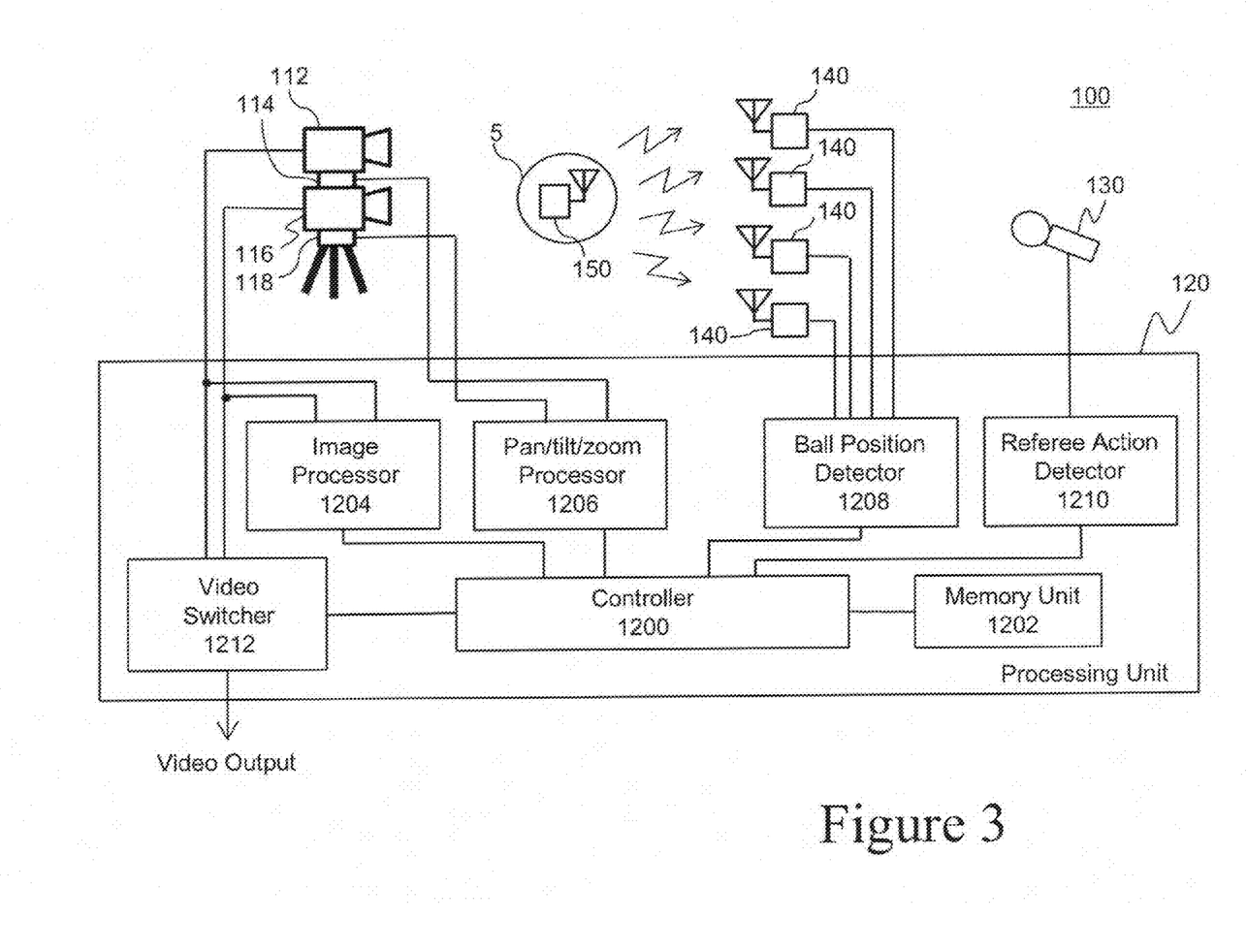
FIG. 3 is a schematic block diagram of the automatic ball tracking camera according to an exemplary embodiment.

FIG. 3 is a schematic block diagram of an automatic ball tracking camera 100 according to an exemplary embodiment. In FIG. 3, the automatic ball tracking camera 100 includes the two-stage camera unit including the video cameras 112, 116 and the pan-tilt pods 114, 118, the processing unit 120, the microphone 130, the ball position sensors 140, and the transmitter 150. The processing unit 120 includes a controller 1200, a memory unit 1202, an image processor 1204, a pan/tilt/zoom controller 1206, a ball position detector 1208, a referee action detector 1210, and a video switcher 1212.

The controller 1200 receives video image analysis results from the image processor 1204, ball position detection results from the ball position detector 1208, and referee action detection results from the referee action detector 1210. In response to these results received, the controller 1200 controls the pan/tilt/zoom controller 1206 to adjust the viewing directions and the zoom magnifications of the video cameras 112 and 116 for tracking the ball 5 position and outputting video images in the close-up mode or the wide-shot mode or the predesigned shot mode. Note that in the present specification each view mode corresponds to a certain range of zoom magnification or field of view. Actual ranges for the respective view modes differ from game to game.

The zoom magnifications for the respective modes may be arbitrary set depending on the type of ball sports. If it is desirable to see players, a higher zoom magnification may be selected for the close-up mode whereas a much smaller zoom magnification may be desirable for the wide-shot mode to provide an overall picture of game. For example, the output video image in the wide-shot mode may cover one half to a whole area of the field 30. The zoom magnifications for the predesigned shots may be selected in advance so as to maximize the chance to take preferable video shots suitable for particular situations during a game. Typically, the predesigned shot may be taken with a higher zoom magnification or a smaller field of view than the video images in the wide-shot mode, but a lower zoom magnification or wider field of view than in the close-up mode.

The controller 1200 also controls the video switcher 1212 in synchronization with the adjustment movement of the video camera so that only the video image of the video camera that has been adjusted may be selected as the output.

The memory unit 1202 stores plural sets of target parameters in association with ball positions in the field 30. Each set of target parameters enables to take the predesigned shots and includes at least the viewing direction and the zoom magnification.

The video switcher 1212 receives two video signals from the two video cameras 112 and 116, select one of the two video signals in response to a control signal from the controller 1200, and outputs the selected video signal as the video output of the automatic ball tracking camera 100.

The image processor 1204 receives video signals from the video cameras 112 and 116, analyzes an output video image that corresponds to one of the video signals received and is currently in use for output, and determines whether the ball 5 position moves out from the preset area defined on the output video image or not. The image processor 1204 repeats this analysis every time the image switcher 1212 switches the output. Various object recognition techniques as would be understood by one of ordinary skill in the art may be employed for detecting the ball 5 position 5 by analyzing the output video image. For example, appearance-based methods such as edge matching or feature-based methods using particular designs on ball surfaces may be employed. Further, a tape or paint that reflects a particular wavelength of light may be attached or painted to increase visibility of the ball 6 in the output video image.

Note that the preset area is a virtual area defined on the output video image and smaller than its field of view. The preset area for the close-up mode may be set at or near the center of the output video image. Using the preset area allows the automatic ball tracking camera to complete the adjustment movement and switch to the new output video image captured from the new viewing direction before the ball 5 disappears from the current output video image. The size of the preset area may be fixed or varied in response to the moving speed of the ball 5 or the zoom magnification of the current view mode. Alternatively, the preset area in the close-up mode may be redefined so as to include a particular point of interest such as the goal 31, the penalty area 32, the corner arc 33, or the like when the ball 5 approaches or arrives at the particular points of interest.

The preset area for the predesigned shot mode may also be set in relation to the position of the ball 5 in the field 30. For example, the preset area may be defined in advance so as to include any of the particular points of interest. Information regarding the preset areas of the respective predesigned shots may be stored in the memory unit 1202.

In the wide-shot mode, a smaller preset area may be set around the ball 5 position. This reduces the time to take to shift the view mode from the wide-shot mode to the close-up mode or the predesigned shot mode as soon as the ball 5 movement started.

The pan/tilt/zoom controller 1206 receives a control signal indicative of target viewing direction and zoom magnification from the controller 1200, and controls the operations of the pan-tilt pods 114 and 118 and the zoom drive mechanisms of the video cameras 112 and 116 to achieve the target viewing direction and target zoom magnification.

The ball position detector 1208 receives outputs from the ball position sensors 140, triangulates the ball 5 position in the field 30, and sends a signal indicative of the ball position to the controller 1200. The transmitter 150 is embedded in the ball 5. The transmitter 150 transmits a radio signal at a preset frequency. The ball position sensors 140 arranged around the field 30 detect the emitted radio signal from the transmitter 150 for measurement of distance and send the outputs indicative of their respective measurement results to the ball position detector 1208. The method of ball position measurement is not limited to this example, and any other object detection techniques may be employed. For example, a GPS receiver and a transmitter may be buried in the ball 5 in place of the transmitter 150 for detecting the ball position and sending out the detected position information. Alternatively, a drone carrying a video camera may be flown over the field 30 during a game for directly detecting the ball position in the field 30. Further, the sensors 140 may be cameras themselves which utilize image analysis techniques such as analyzing the color of the ball, the playing field, the speed and size of the ball to determine where the ball is on the field as well as which direction the ball is going.

In the present embodiment, the ball 5 position within the video image is determined by image analysis. In this embodiment, the automatic ball tracking camera performs image analysis to convert the ball 5 position within the video image to an actual position in the field 30. However, in some situation in a game, the ball 5 may be hidden from the video cameras 112 and 116 by one or more players standing between the video camera and the ball 5. Thus, alternatively or in addition to, the automatic ball tracking camera system may have an independent ball position detection means, described above, that does not rely on the image processing of video images taken by the video camera 112 or 116.

The referee action detector 1210 receives the output of the microphone 130, detects the sound of referee whistle, and sends a detection result to the controller 1200. The detection of referee whistle may be achieved by comparing the output from the microphone 130 with acoustic signatures of the referee whistle obtained in advance. Alternatively, the microphone 130 may be worn by a referee and its output may be wirelessly transmitted to the processing unit 120.

In another embodiment, hand actions or flag movement of a referee or linesmen may be detected in addition to the whistle. The referee may ware an accelerometer at hand and its output may be wirelessly transmitted to the processing unit 120 for detecting a hand motion. Detecting the referee action allows the automatic ball tracking camera 100 to perform a particular operation suitable for an interrupted period of a game after the referee action, which will be described in detail below. Also, if the location of the referee is tracked similar to that of the ball 5, the automatic ball tracking camera can automatically switch to a video camera module having a feed of the referee.

Figure 4:
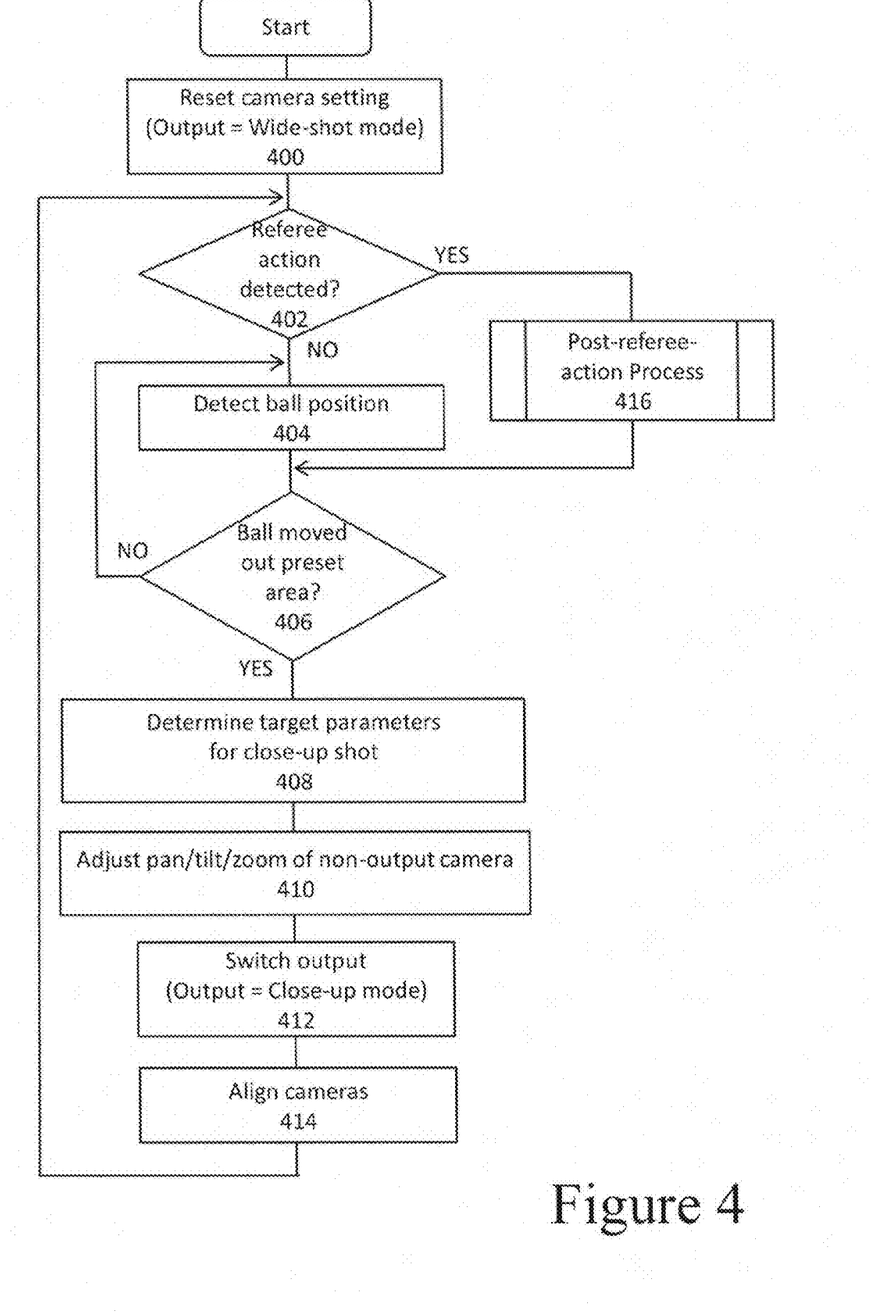
FIG. 4 is an algorithmic flow chart for the automatic ball tracking camera according to an exemplary embodiment.

FIG. 4 is an algorithmic flow chart for an automatic ball tracking camera 100 according to an exemplary embodiment. First, the two-stage camera unit 110 is reset to an initial setting at step S400. In the initial setting, the two video cameras 112 and 116 are aligned to a default viewing direction (for example, see FIG. 2), and the video cameras 112 and 116 take video images in the wide-shot mode. The video switcher 1212 selects one of the video cameras 112 and 116 according to a default selection as the video output. The initial position of the ball 5 is detected with the ball position sensors 140 and the ball position detector 1208. The video image in the wide-shot mode may be a field-wide shot covering the whole field 30 or a wide-shot covering one-half of the field 30 in which the ball 5 is detected. This initial setting provides viewers of the output video image with an overall picture of a game at start.

Next, at step S402, the controller 1200 determines whether the referee action is detected with the referee action detector 1210 or not. When the referee action is detected, the process proceeds to step S416 to perform a post referee action process, which will be described below with FIG. 6. When no referee action is detected, the process proceeds to step S404.

At step S404 the image processor 1204 analyzes an output video image from the video camera currently in use for output (hereinafter, referred to as "output camera") to detect the ball 5 position on the output video image. Subsequently, the image processor 1204 determines whether the ball 5 position moved out from the preset area defined on the output video image or not. The preset area is defined by the image processor 1204 in response to the view mode of the output video image. This determination may be performed by detecting the ball position in the output video image using pattern matching or the like and determining whether coordinates of the detected ball position is out of coordinate ranges of the preset area or not. When the ball 5 position is inside the preset area, the process returns to step S404. When the ball 5 position is outside the preset area, the process proceeds to step S408.

At step S408 the controller 1200 determines a target viewing direction and a target zoom magnification for the video camera currently not in use for output (hereinafter, referred to as "non-output camera") so that the ball 5 appears inside the preset area of a video image in the close-up mode to be taken at the target viewing direction and the target zoom magnification. Note that the target viewing direction is determined in consideration of the moving speed of the ball 5. When the image processor 1204 determines that the ball 5 position moved out from the preset area, the controller 1200 calculates the moving direction and speed of the ball 5 using the current and past position data of the ball 5 and further calculates an estimated position of the ball 5 after the adjustment movement. The target viewing direction is determined so that the estimated ball 5 position is located inside the preset area of the next output video image after the adjustment movement. Preferably, the target viewing direction may be determined so that the current output video image and the next output video image partially overlap each other. This allows viewers to have a sense of continuity in the output video images before and after the switching of video output.

In the present embodiment, the zoom magnification is kept constant for the same view mode. Thus, no adjustment is necessary with regard to the zoom magnification when the previous output video image is in the close-up mode unless a game is interrupted by the referee's action. This simplifies the operation process and facilitates quick response in the ball tracking. Alternatively, the zoom magnification may be varied in response to the moving speed of the ball 5. For example, the zoom magnification may be reduced for the next output video image when a larger moving speed of the ball 5 is calculated whereas the zoom magnification may be increased when a smaller moving speed of the ball 5 is calculated.

At step S410, the controller 1200 sends a control signal to the pan/tilt/zoom controller 1206 to achieve the target viewing direction and the target zoom magnification at the non-output camera. Upon receiving the control signal, the pan/tilt/zoom controller 1206 controls the pan-tilt pod on which the non-output camera is mounted and the zoom drive mechanism of the non-output camera for adjustment. Subsequently, at step S412, the controller 1200 controls the video switcher 1212 to switch the video output from the current output camera to the non-output camera that has been adjusted. Further, at step S414, the controller 1200 controls the pan/tilt/zoom controller 1206 to align the new non-output camera with the new output camera. After completing the alignment, the process returns to step S402. The adjustment of the non-output camera, the switching of the video output, and the alignment of the two video cameras 112 and 116 are performed in sequence. This enables to provide continuous stable close-up shots while accurately tracking the ball 5.

Figure 5A:
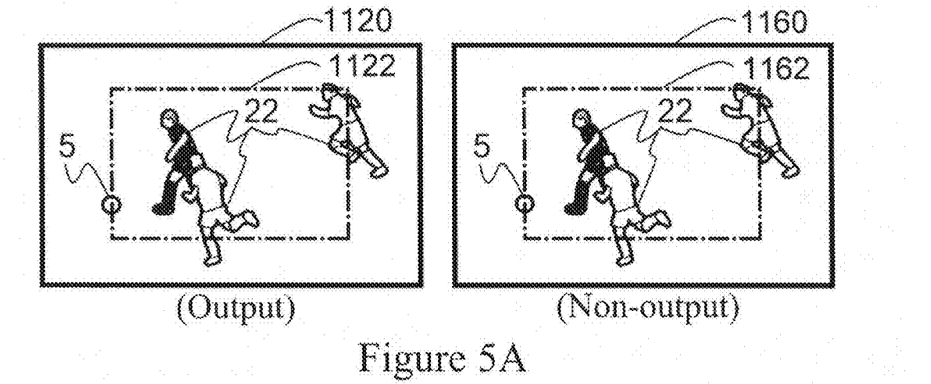
FIGS. 5A-5C illustrate exemplary outputs of two video cameras in time sequence in the automatic ball tracking camera according to an exemplary embodiment.
Figure 5B:
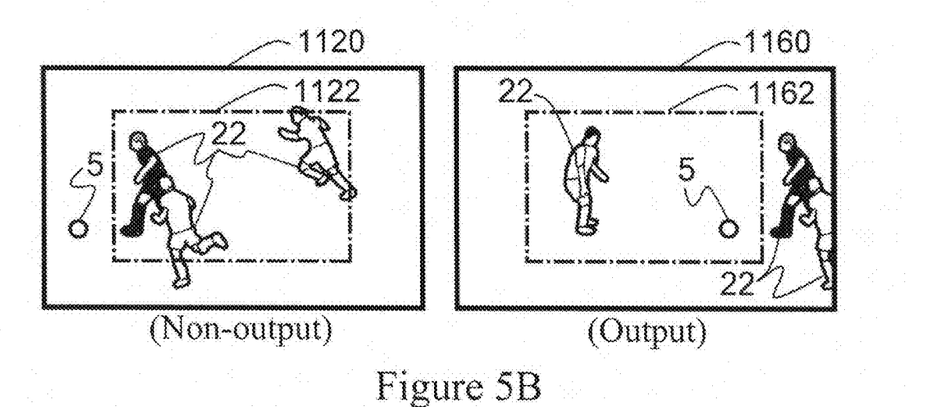
Figure 5C:
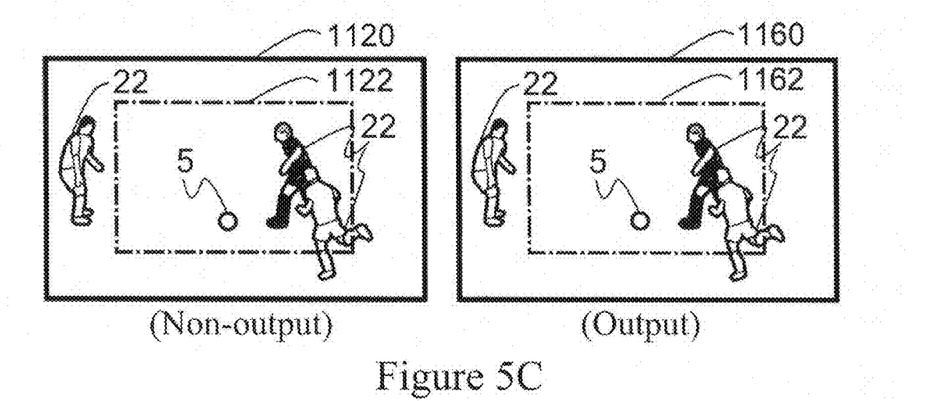

FIGS. 5A to 5C illustrate exemplary video images of the two video cameras 112 and 116 in time sequence in the close-up mode. A video image 1120 is an image shot captured by the video camera 112 in the close-up mode and includes the ball 5 and players 22. On the video image 1120, a preset area 1122 is defined for performing the determination at step S406. Note that the preset area 1122 is added only to assist an understanding and does not appear in the actual output video image. A video image 1160 is an image captured by the video camera 116 on which a preset area 1162 is defined.

FIG. 5A illustrates the video images 1120 and 1160 before the adjustment movement at step S410. Here, the video cameras 112 and 116 are aligned with each other, and thus are substantially identical. It is assumed that the video camera 112 is currently selected as the output camera. The video image 1120 becomes the output video image and is outputted as the video output of the automatic ball tracking camera 100. Further, currently, the video camera 116 is the non-output camera and the video image 1160 is the non-output video image. The video image 1120 captures that the ball 5 has just moved out from the preset area 1122. When the image processor 1204 receives the video image 1120 for the ball position detection at step S404, the image processor 1204 determines that the ball 5 position moved out from the preset area 1122 (Yes at step S406). The process then proceeds to step S408.

FIG. 5B illustrates the video images 1120 and 1160 after the target determination at step S408, the adjustment movement at step S410, and the video output switching at step S412. In this example, the video camera 116 is adjusted at step S410 while the video camera 112 is kept at the same viewing direction. Thus, the video images 1120 and 1160 are not identical any more. Further, in this example, the video output is switched from the video image 1120 to the video image 1160. Now the video image 1160 is outputted as the video output of the automatic ball tracking camera 100.

The video image 1120 is an exemplary video shot of the new non-output camera after a short period of time that takes to complete steps S408 to S412. In the video image 1120, the ball 5 further moves out from the preset area 1122 and is moving out from the video image 1120. During this period, the video camera 112 is kept at the same viewing direction. The video image 1160 is an exemplary video shot of the new output camera after the same period as in the video image 1120. Here, the ball 5 is recaptured within the preset area 1162 in the close-up mode. During this period, the pan-tilt pod 118 is controlled to turn the video camera 116 in the panning direction to recapture the ball 5 within the preset area 1162 at the target viewing direction. Note that although in this example the non-output camera is rotated only in the panning direction, the adjustment may also be performed with a rotation in the tilting direction or rotations in both the panning and tilting directions.

FIG. 5C illustrates the video images 1120 and 1160 after the alignment of the video cameras 112 and 116 at step S414. Upon completing the switching at step S412, the controller 1200 controls the pan/tilt/zoom controller 1206 to change the viewing direction of the video camera 112 to align with the video camera 116 to prepare for the next adjustment movement. Here, the two video cameras 112 and 116 are aligned with each other, and thus the video images 1120 and 1160 are substantially identical except now the video image 1160 is the output video image.

Figure 6:
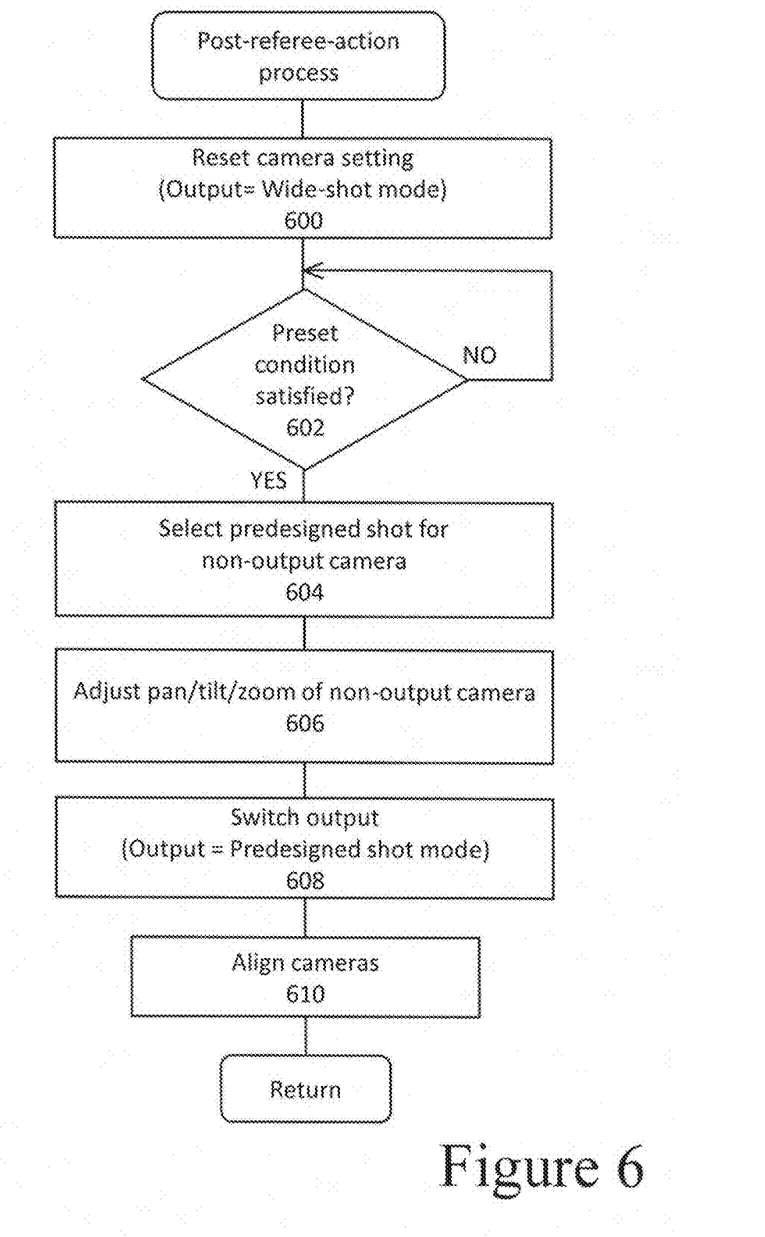
FIG. 6 is an algorithmic flow chart for performing a post referee action process in the automatic ball tracking camera according to an exemplary embodiment.

FIG. 6 is an algorithmic flow chart for performing the post referee action process at step S416 of FIG. 4 according to an exemplary embodiment. First, the two-stage camera unit 110 is reset to the initial setting at step S600 as is performed at step 400. When the referee action such as the sound of referee whistle is detected, the non-output camera at the time of the referee action detection is subjected to the adjustment movement so as to take an output video image in the wide-shot mode. Further, after completing the adjustment movement, the video output is switched to the non-output camera thus adjusted, and then the new non-output camera is rotated to align with the new output camera.

Next, at step 602, the controller 1200 determines whether any one of preset conditions is satisfied or not. The preset conditions are defined in advance in association with the predesigned shots and stored in the memory unit 1202. The preset condition is used to trigger taking of the corresponding predesigned shot. For example, the controller 1200 may determine whether the ball 5 position stays at substantially the same place for a preset period of time or not. Alternatively, the controller 1200 may determine whether the ball 5 position moved out the field 30 or not, or may simply count down a preset time. The ball 5 position may be periodically detected at a certain frequency with image processor 1204 using the output video image in the wide-shot mode or with the ball position detector 1208. Step S602 is repeated until any one of the preset conditions is satisfied. When one of the preset conditions is satisfied, the process proceeds to step S604.

At step S604, the controller 1200 determines the predesigned shot to be used in accordance with the preset condition satisfied and the current ball 5 position. For example, when it is determined that the ball 5 position stays at the same position for several ten seconds or more and the ball 5 position is inside the penalty area 32, the controller 1200 may select the predesigned shot that is suitable for a penalty kick from the penalty area. Once the predesigned shot is selected, the controller 1200 reads the corresponding target parameters such as the viewing direction and zoom magnification from the memory unit 1202

At step S606 the controller 1200 controls the pan/tilt/zoom controller 1206 to the adjust the non-output camera based on the selected target parameters. Subsequently, at step S608, the controller 1200 controls the video switcher 1212 to switch the video output. This enables to switch automatically from the wide-shot mode to the predesigned shot mode or from a general purpose view to a particular purpose view suitable for the current situation in a game.

Finally, at step 610, the controller 1200 controls the pan/tilt/zoom controller 1206 to align the current non-output camera with the output camera. After completing the alignment, the process returns to step S406 of FIG. 4.

Figure 7:
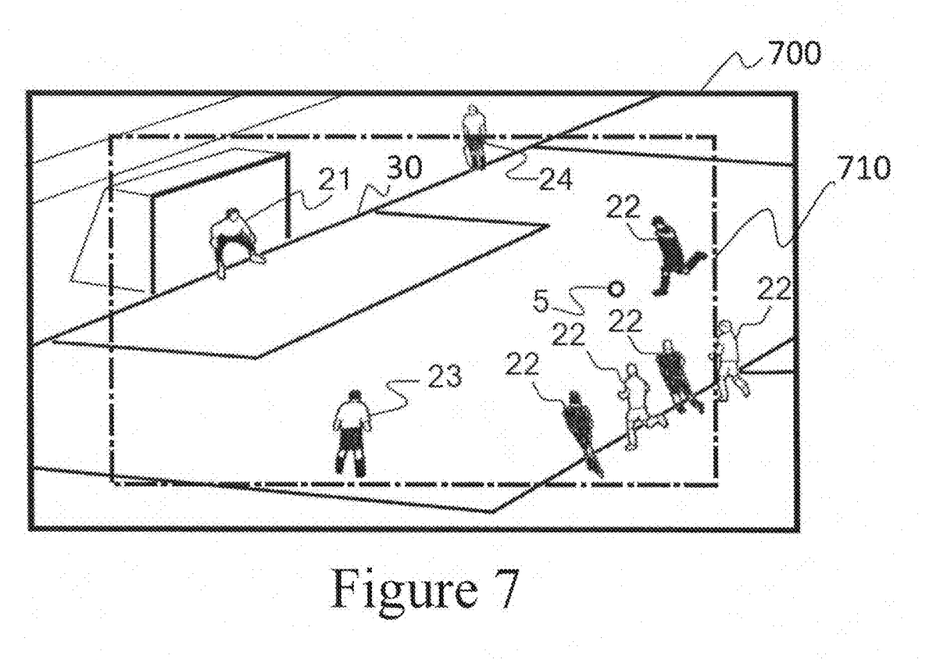
FIG. 7 illustrates an example of predesigned shot in the automatic ball tracking camera according to an exemplary embodiment.

FIG. 7 illustrates an exemplary video image 700 in one of the predesigned shots. This exemplary video image is a video shot just before a penalty kick starts. In this predesigned shot, the viewing direction and the zoom magnification are determined so that the output video image includes both the ball 5 placed on a penalty mark and the goal. As long as the ball 5 position is within a preset area 710, the predesigned shot will be maintained. This allows viewers to watch game actions taking places near the point of interest in the predesigned shot.

In the video image 710, one of players 22 is about to kick the ball 5 placed on the penalty mark. The other players 22 are waiting at outside the penalty area. A chief referee 23 is holding a whistle and watching attentively movements of the ball 5, the players 22, and a goal keeper 21 while a linesman 24 standing by the goal with a flag to monitor a goal line. Typically, the zoom magnifications used in the predesigned shots are lower than the close-up shots but higher than the wide-shots. The video image becomes more interesting in the close-up mode, for viewers are able to watch the players 22 more closely. However, viewers are also interested in watching goal shootings. The predesigned shots may be determined so as to satisfy such interests.

The automatic ball tracking camera provides numerous advantages over existing systems. For example, viewers can now ensure a more stable and exciting viewing of sports via a system that automatically guides one or more cameras to where an object of interest is located so that the object of interest is always front and center in the frame. Further, the automatic ball tracking camera provides a better viewing experience while not requiring as much maintenance or human intervention. Therefore, cost can be saved by using the automatic ball tracking camera. Additionally, as cameras become more and more pervasive in sports and other activities, and due to the precision required in lucrative sports, it is important to always have the best view possible of the ball. For example, referees in many sports are now allowed to review penalty calls or utilize cameras to enhance their decision making skills. The automatic ball tracking camera would provide enhanced tracking of the ball at all times thereby providing officials with enhanced information when making decisions.

Figure 8:
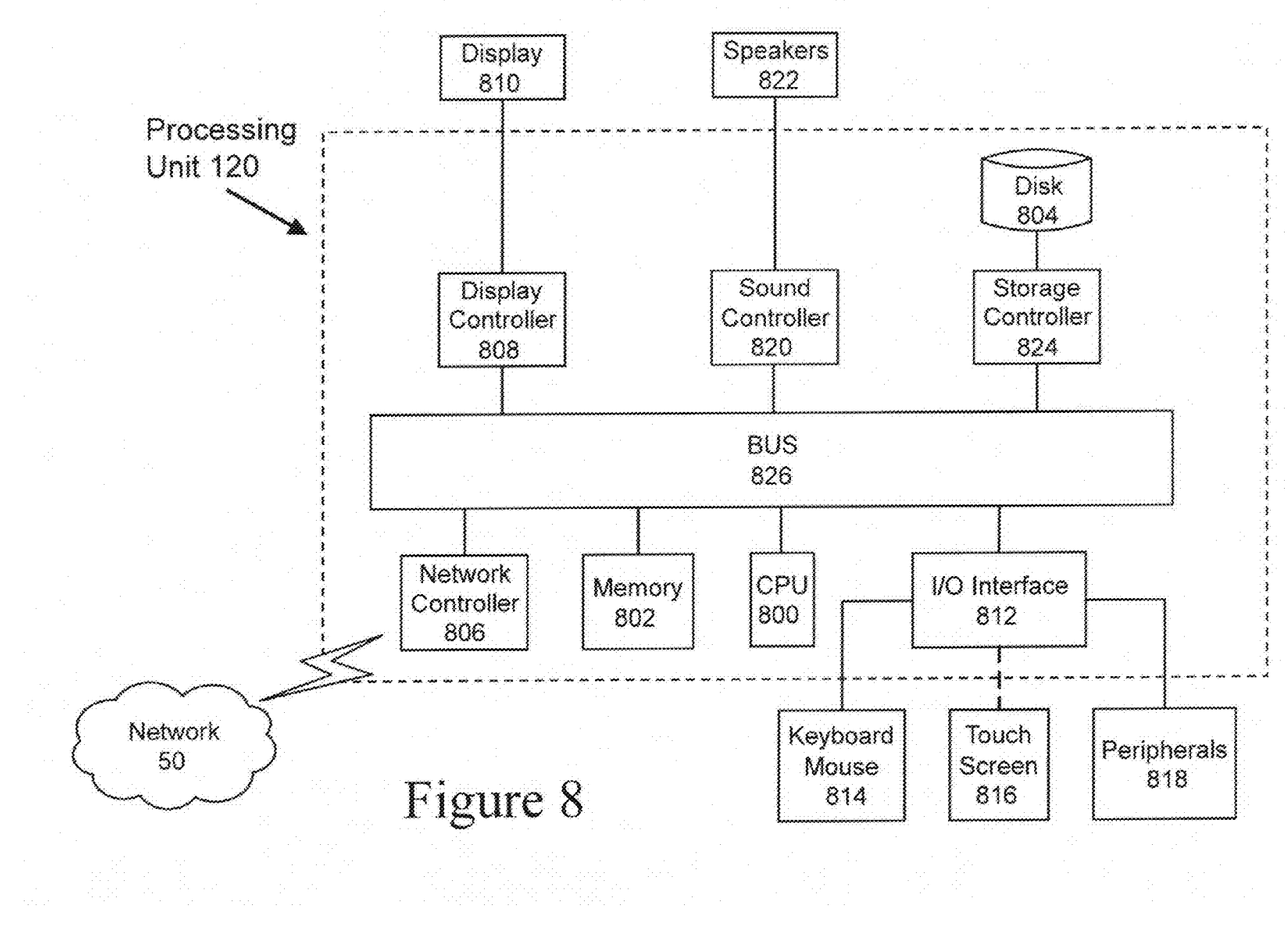
FIG. 8 is a hardware block diagram of a control unit of the automatic ball tracking camera according to an exemplary embodiment.

FIG. 8 is a hardware block diagram of the processing unit 120 according to an exemplary embodiment is described. In FIG. 8, the processing unit 120 includes a CPU 800, which performs the processes described above. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing unit 120 communicates, such as a server or computer.

Further, the claimed advancements may be provided as a utility application, background daemon, or component of an operating system, or combination thereof, executing in conjunction with CPU 800 and an operating system such as Microsoft Windows 8, UNIX, Solaris, LINUX, Apple MAC-OS and other systems known to those skilled in the art. CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

The processing unit in FIG. 8 also includes a network controller 806, such as an Intel Ethernet PRO network interface card from Intel Corporation of America, for interfacing with network 50. As can be appreciated, the network 50 can be a public network, such as the Internet, or a private network such as an LAN or WAN network, or any combination thereof and can include PSTN or ISDN sub-networks. The network 50 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The processing unit 120 further includes a display controller 808, such as a NVIDIA GeForce GTX or Quadro graphics adaptor from NVIDIA Corporation of America for interfacing with display 810, such as a Hewlett Packard HPL2445w LCD monitor. A general-purpose I/O interface 812 interfaces with a keyboard and/or mouse 814 as well as a touch screen panel 816 on or separate from display 810. General-purpose I/O interface also connects to a variety of peripherals 818 including printers and scanners, such as an OfficeJet or DeskJet from Hewlett Packard.

A sound controller 820 is also provided in the processing unit 120, such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the processing unit 120. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. An automatic ball tracking camera for taking video images of a ball game, the camera comprising:
   a two-stage video camera unit including two sets of camera modules, each camera module including a video camera, a zoom lens fitted on the video camera, a zoom drive mechanism for changing a zoom magnification, and a pan-tilt pod on which the video camera is mounted for changing a viewing direction of the video camera;
   a video switcher configured to receive two video signals from the two video cameras and select one of the two video signals as output;
   an image processor configured to receive one of the two video signals currently in use for output, analyze an output video image corresponding to the video signal currently in use for output, and determine whether a ball position moves out from a preset area defined on the output video image; and
   a controller configured to, when the image processor determines that the ball position moves out from the preset area,
      determine a target viewing direction for the video camera currently not in use for output so that a video image to be taken at the target viewing angle in a close-up mode recaptures the ball within the preset area,
      control the pan-tilt pod of the video camera currently not in use for output for adjustment to achieve the target viewing direction, and
      control the video switcher to switch the output by selecting the video signal of the adjusted video camera as the output,
      wherein, after switching the output, the controller further controls the pan-tilt pod of the video camera that is adjusted to align with the video camera currently in use for output.

2. The automatic ball tracking camera according to claim 1, wherein the output video images before and after switching the output partially overlap each other.

3. The automatic ball tracking camera according to claim 1, wherein the image processor further determines whether a preset point of interest is included in the output video image or not, and redefines the preset area so as to include the ball position and the preset point of interest therein when the preset point of interest is included in the output video image.

4. The automatic ball tracking camera according to claim 3, wherein the image processor further determines a moving speed of the ball by analyzing the output video image and varies a size of the preset area in response to the moving speed of the ball.

5. The automatic ball tracking camera according to claim 1, wherein the controller further determines a target zoom magnification of the video camera currently not in use for output so that a video image to be taken at the target viewing angle and the target zoom magnification in a close-up mode recaptures the ball within the preset area.

6. The automatic ball tracking camera according to claim 5, wherein the controller further calculates a moving speed of the ball based on history data of the ball position determined by the image processor, and determines the target zoom magnification in response to the speed of the ball.

7. The automatic ball tracking camera according to claim 1, wherein the controller further calculates a moving speed and direction of the ball at a time of determination that the ball moves out from the preset area based on history data of the ball position determined by the image processor, estimates the ball position after an adjustment time period of the video camera currently not in use for output based on the moving speed and direction of the ball, and determines the target viewing direction based on the estimated ball position.

8. The automatic ball tracking camera according to claim 1, further comprising:
a referee action detector configured to detect a referee action, wherein
when the referee action is detected, the controller adjusts the viewing direction and the zoom magnification of the video camera currently not in use for output to capture a video image in a wide-shot mode and controls the video switcher to switch the output by selecting the video signal of the adjusted video camera as the output.

9. The automatic ball tracking camera according to claim 8, further comprising:
a memory unit configured to store one or more sets of target parameters and corresponding positions in a game field, each set of target parameters enabling the video camera to take a predesigned shot that matches the corresponding position in the game field, wherein the controller
selects one of the sets of target parameters when the ball position stays at substantially a same location for a preset period of time after the referee action is detected, the selected set of target parameters corresponding to the predesigned shot that matches the location where the ball position stays for a preset period of time,
adjusts the pan-tilt pod and the zoom drive mechanism of the video camera currently not in use for output based on the selected set of target parameters, and
controls the video switcher to switch the output by selecting the video signal of the adjusted video camera as the output.

10. The automatic ball tracking camera according to claim 9, wherein fields of view in the predesigned shots are narrower than in the wide-shot views and wider than in the close-up views.

11. The automatic ball tracking camera according to claim 8, wherein the image processor further defines a preset area on the output video image in the wide-shot mode and determines whether or not the ball position moves out from the preset area.

12. The automatic ball tracking camera according to claim 9, wherein the image processor further define a preset area on the output video image in the predesigned shot mode and determine whether the ball position moves out from the preset area or not.

13. The automatic ball tracking camera according to claim 1, further comprising:
a ball position detecting portion including one or more radio signal receivers for receiving one or more signals transmitted from a radio signal transmitter located in the ball, and
a ball position detector that determines the ball position by triangulation using the received one or more signals.

14. The automatic ball tracking camera according to claim 13, wherein, when the image processor fails to detect the ball position in the output video image, the controller
receives the ball position detected by the ball position detecting portion,
adjusts the viewing direction and the zoom magnification of the video camera currently not in use for output to take a video image in a wide-shot mode so as to recapture the ball, and
controls the video switcher to switch the output by selecting the video signal of the adjusted video camera as the output.

15. The automatic ball tracking camera according to claim 8, wherein the referee action detector includes a microphone and a signal processor for comparing output of the microphone with acoustic signatures of a referee whistle.

16. An automatic ball tracking method implemented by an automatic ball tracking camera for taking video images of a ball game, the method comprising:
a video switcher configured to receive two video signals from a two-stage video camera unit and select one of the two video signals as output, the two-stage video camera unit including two sets of camera modules, each camera module including a video camera, a zoom lens fitted on the video camera, a zoom drive mechanism for changing a zoom magnification, and a pan-tilt pod on which the video camera is mounted for changing a viewing direction of the video camera;
receiving, at an image processor of the automatic ball tracking camera, one of the two video signals currently in use for output;
analyzing, via the image processor, an output video image corresponding to the video signal currently in use for output;
determining, via the image processor, whether a ball position moves out from a preset area defined on the output video image; and
when the image processor determines that the ball position moves out from the preset area,
determining a target viewing direction for the video camera currently not in use for output so that a video image to be taken at the target viewing angle in a close-up mode recaptures the ball within the preset area,
controlling the pan-tilt pod of the video camera currently not in use for output for adjustment to achieve the target viewing direction, and
controlling the video switcher to switch the output by selecting the video signal of the adjusted video camera as the output,
wherein, after switching the output, the controller further controls the pan-tilt pod of the video camera that is adjusted to align with the video camera currently in use for output.

* * * * *